S. PICARD.
ARBOR INDICATOR.
APPLICATION FILED OCT. 30, 1918.

1,297,729.

Patented Mar. 18, 1919.

INVENTOR.
Stanislas Picard
Joseph A. Miller
ATTORNEY.

UNITED STATES PATENT OFFICE.

STANISLAS PICARD, OF PROVIDENCE, RHODE ISLAND.

ARBOR-INDICATOR.

1,297,729.  Specification of Letters Patent.  Patented Mar. 18, 1919.

Application filed October 30, 1918. Serial No. 260,305.

*To all whom it may concern:*

Be it known that I, STANISLAS PICARD, a citizen of the United States, residing at Providence, in the county of Providence and State of Rhode Island, have invented a new and useful Improvement in Arbor-Indicators, of which the following is a specification.

This invention relates to certain new and useful improvements in an arbor indicator and more particularly to an improved device for centering work relative to the live arbor.

The invention aims to provide such a device or instrument by which the dead center may be quickly and accurately located, and it consists broadly of a spindle-like support, adapted to have frictional fit in the live arbor of a machine, and a flexible yieldable and axially-arranged tool holder carried thereby and adapted to support a tool or gage in a transverse position for contact with the inner circumference of a body which is to be secured in the machine for reaming or drilling.

The invention further resides in the details of construction and the arrangements and combinations of parts hereinafter described and claimed, reference being had to the accompanying drawings wherein—

Figure 1:
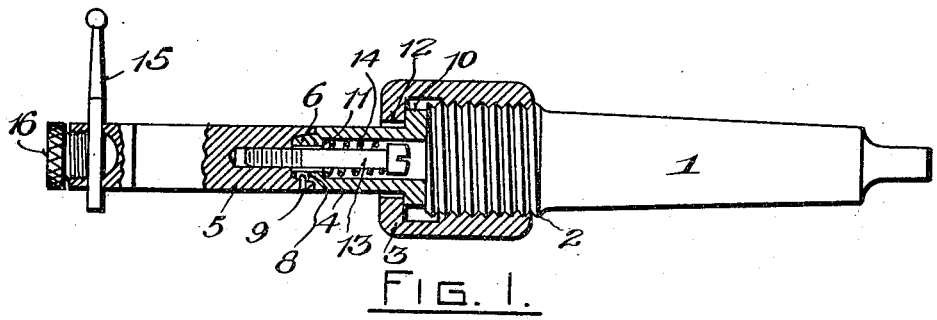
Figure 1 is a longitudinal section through the improved device, parts being left in elevation.

Referring more in detail to the drawing, a tapering spindle 1 is illustrated, the same being designed to have frictional fit in the live arbor of a lathe. The outer or larger end of the spindle is externally screw threaded at 2 to receive a coupling member 3 which is employed to secure the centering member axially to the spindle.

This centering member is composed of two sections or parts 4 and 5 that are normally axially alined although movable into angular relation by means of ball-like projection 6 on the end of the inner part 4 fitting the socket 7 in the abutting end of the outer part 5. The ball projection 6 is depicted as formed with a longitudinal slot 8 in which operates a pin 9, extending inwardly from the side of the socket, whereby the two parts are held against relative rotation although permitted to flex.

The inner part is tubular being formed with a peripheral flange 10 at its inner end, to be engaged by the coupling member, and an internal shoulder 11 at its opposite end. In this connection it will be noted that the opening 12 in the coupling member 3 is sufficiently larger than its encircled centering member to permit a radial adjustment of the latter for alinement with the spindle 1.

A screw 13 has its headed end arranged within the tubular part 4 and passes through the ball 6 into the outer part 5, being threaded thereinto. A coiled spring 14 is interposed between the internal shoulder 11 and the head of the screw serving to yieldably hold the ball in its socket.

The outer end of the outer part or section 5 is formed with an axial screw threaded opening leading to a transverse seat in which latter is disposed the tool or gage 15, being held therein by the thumb nut or set screw 16 fitting said axial opening.

In operation, if it is desired to ream out or rebore a hole or cylinder in a structure, the tool is connected or secured in its seat in the outer end of part 5 depending upon the diameter of the hole. The structure is then brought into such position that one side of the cylinder bearing on the round end of the tool 15 will slightly flex the end or part 5. A reading on a gage will then be taken such, for instance, as two one-thousandths of an inch. The complete arbor indicator is then rotated and the structure with the hole adjusted so that in rotation of the arbor indicator the tool will have an equal bearing on the entire inner circumference of the hole as indicated by the gage or two-one-thousandths. The structure is then locked in position, the arbor indicator removed from the live spindle and a proper tool for reaming or drilling substituted therefor.

Thus, the dead center will have been ascertained and a true drilling operation is assured. The device is simple in construction and is readily mounted in a machine and removed therefrom.

Figure 2:
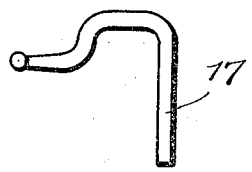
Fig. 2 is a detailed elevation of a modified form of tool.
Figure 3:
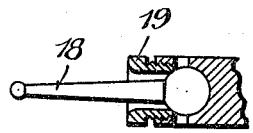
Fig. 3 is a similar view of another form of tool, or gage, showing the manner of securing it in the centering member, the latter being disclosed in sectional fragment.
Figure 4:
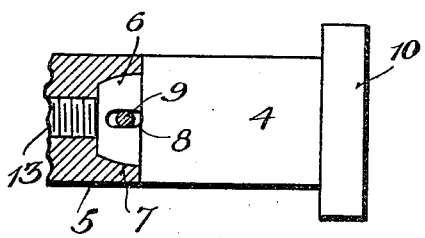
Figs. 4 and 5 are fragmental views of the centering member in different positions.
Figure 5:
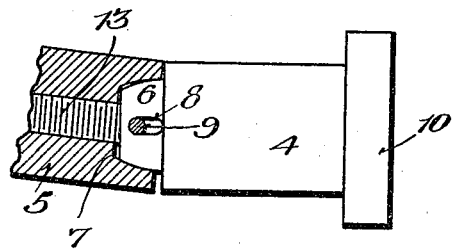

In Figs. 2 and 3 are illustrated further embodiments of a tool which can be substituted for tool 15 in gaging different work, the tool 17 being of angular design while tool 18 extends axially through a bore in the set screw 19.

Having thus described my invention, what I claim as new and desire to secure by Letters Patent is—

1. An arbor indicator comprising a spindle formed at one end to fit a live arbor and having its opposite end screw threaded, a centering member consisting of an inner tubular part having a peripheral flange at one end and a hollow ball-shaped projection on its opposite end, an outer part socketed at one end to receive the ball projection and having its opposite end formed with a transverse tool seat and an axial set screw opening, a screw disposed within the tubular inner part and projecting through the ball projection thereof and threaded into the outer part, a coiled spring encircling the screw within the inner part for yieldably holding the two parts together, said ball projection longitudinally slotted, a pin extending into the slot from the socket of the outer part for connecting the two parts for rotation, and a coupling engaged on the threads of the spindle and over the flange of the inner part.

2. An arbor indicator comprising a spindle formed at one end to fit a live arbor and having its opposite end screw threaded, a centering member having a tool seat in its outer end and a flange at its inner end abutting the threaded end of the spindle, and a coupling member engaged on the threads of the spindle and over the flange of the centering member, said coupling freely receiving the latter to permit of centering adjustment of said centering member relative to the spindle.

3. An arbor indicator comprising an inner part formed at one end with means of connection with a spindle or the like, an outer part arranged end to end with the inner part and formed in its free end with a tool seat, and means within the two parts for connecting them end to end for relative transverse pivotal action.

4. An arbor indicator comprising a spindle, and a flexible, tool carrying centering member carried thereby arranged axially thereto and adjustable radially thereof.

5. An arbor indicator comprising a spindle, and a flexible tool-carrying centering member carried thereby consisting of a pair of axially arranged parts yieldably extensible and adjustably connected together.

6. An arbor indicator comprising a spindle, and a flexible tool-carrying centering member carried thereby consisting of a pair of axially arranged parts connected together by a ball and socket joint, and means extending through the joint to prevent displacement of either part.

7. An arbor indicator comprising a spindle, and a flexible tool-carrying centering member caried thereby consisting of a pair of axially arranged parts connected together by a ball and socket joint, and means within the ball and socket for holding the two parts against relative rotation.

8. An arbor indicator comprising a spindle and a flexible tool-carrying centering member carried thereby consisting of a pair of axially arranged parts connected together by a ball and socket joint, one part being hollow, a screw arranged within the last part and passing axially therethrough into the companion part, and a spring within the hollow part for holding the ball within its socket.

9. An arbor indicator comprising a support, a centering member carried thereby and composed of flexibly connected sections arranged end to end, the outer section formed with a seat to support a tool so as to extend laterally from the outer section.

10. An arbor indicator comprising an inner part formed at one end with means of connection with a spindle or the like, an outer part arranged end to end with the inner part and formed in its outer end with a tool seat, means carried by the connected ends of the parts for providing limited axial separation thereof, and means housed by one of the parts for yieldably holding the connected ends together.

In testimony whereof I have signed my name to this specification in the presence of two subscribing witnesses.

STANISLAS PICARD.

Witnesses:
 ADA E. HAGERTY,
 J. A. MILLER.

Copies of this patent may be obtained for five cents each, by addressing the "Commissioner of Patents, Washington, D. C."